United States Patent
Torres (10) Patent No.: US 6,564,282 B1
(45) Date of Patent: May 13, 2003

(54) METHOD AND SYSTEM FOR INCREASING STORAGE CAPACITY IN A DIGITAL IMAGE CAPTURE DEVICE

(75) Inventor: Daniel J. Torres, San Carlos, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/305,905

(22) Filed: May 5, 1999

(51) Int. Cl.[7] .............................................. G06F 12/00
(52) U.S. Cl. ......................... 711/1; 345/555; 358/1.18; 358/909.1; 382/232; 382/239
(58) Field of Search ..................... 711/7, 1; 395/114, 395/117; 382/232, 239; 345/555; 384/231, 233; 358/909.1, 1.18

(56) References Cited

U.S. PATENT DOCUMENTS 5,638,498 A * 6/1997 Tyler et al. ................ 368/1.18
5,991,515 A * 11/1999 Fall et al. ................... 358/1.15
6,091,846 A *  7/2000 Lin et al. .................... 382/145
6,128,413 A * 10/2000 Benamara ................... 382/251

\* cited by examiner

Primary Examiner—Reginald G. Bragdon
Assistant Examiner—Mehdi Namazi
(74) Attorney, Agent, or Firm—Sawyer Law Group LLP (57) ABSTRACT

Method and system aspects for increasing storage capacity in a digital image capture device are described. Compression levels of saved image files are utilized to increase storage capacity by identifying a level of compression of a saved image file in the digital image capture device. The identified level of compression is compared with a predetermined level of compression, and the saved image file is compressed to the predetermined level of compression when the identified level of compression does not match the predetermined level of compression to free storage space in the digital image capture device.

17 Claims, 6 Drawing Sheets

METHOD AND SYSTEM FOR INCREASING STORAGE CAPACITY IN A DIGITAL IMAGE CAPTURE DEVICE

FIELD OF THE INVENTION

The present invention relates generally to an image capture device and more particularly to a method and system for increasing storage capacity on demand in an image capture device.

BACKGROUND OF THE INVENTION

In general, modern digital cameras for taking pictures of scenes and the like typically include an imaging device which is controlled by a computer running a single threaded process. When an image is captured, the imaging device is exposed to light and generates raw image data representing the image. The raw image data ,is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

While digital cameras do alleviate the hassles of using and developing film that are required by film-based cameras, digital cameras are not without their share of concerns. One main concern is the maintenance of storage space in the digital camera. Most users desire the ability to take images on an instant's notice. Inherently, a limitation exists due to the cameras storage capacity. Even with the use JPEG compression techniques to efficiently utilize storage, users are often hampered when taking an image as a result of a lack of storage space. Thus, the ability to efficiently increase the storage capacity in a digital camera is highly desirable.

Accordingly, a need exists for a convenient and efficient manner of increasing storage capacity in an image capture unit. The present invention addresses such a need.

SUMMARY OF THE INVENTION

The present invention provides aspects for increasing storage capacity in a digital image capture device. Compression levels of saved image files are utilized to increase storage capacity by identifying a level of compression of a saved image file in the digital image capture device. The identified level of compression is compared with a predetermined level of compression, and the saved image file is compressed to the predetermined level of compression when the identified level of compression does not match the predetermined level of compression to free storage space in the digital image capture device.

Through the present invention, the ability to increase storage space in a storage device of a digital image capture unit is achieved. Thus, on-demand image capture is successfully supported with reduced risk of a lack of storage space. These and other advantages of the aspects of the present invention Will be more fully understood in conjunction with the following detailed description and accompanying drawings.

DETAILED DESCRIPTION OF THE INVENTION

The present invention relates to a method and system for increasing storage capacity in a digital image capture device. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
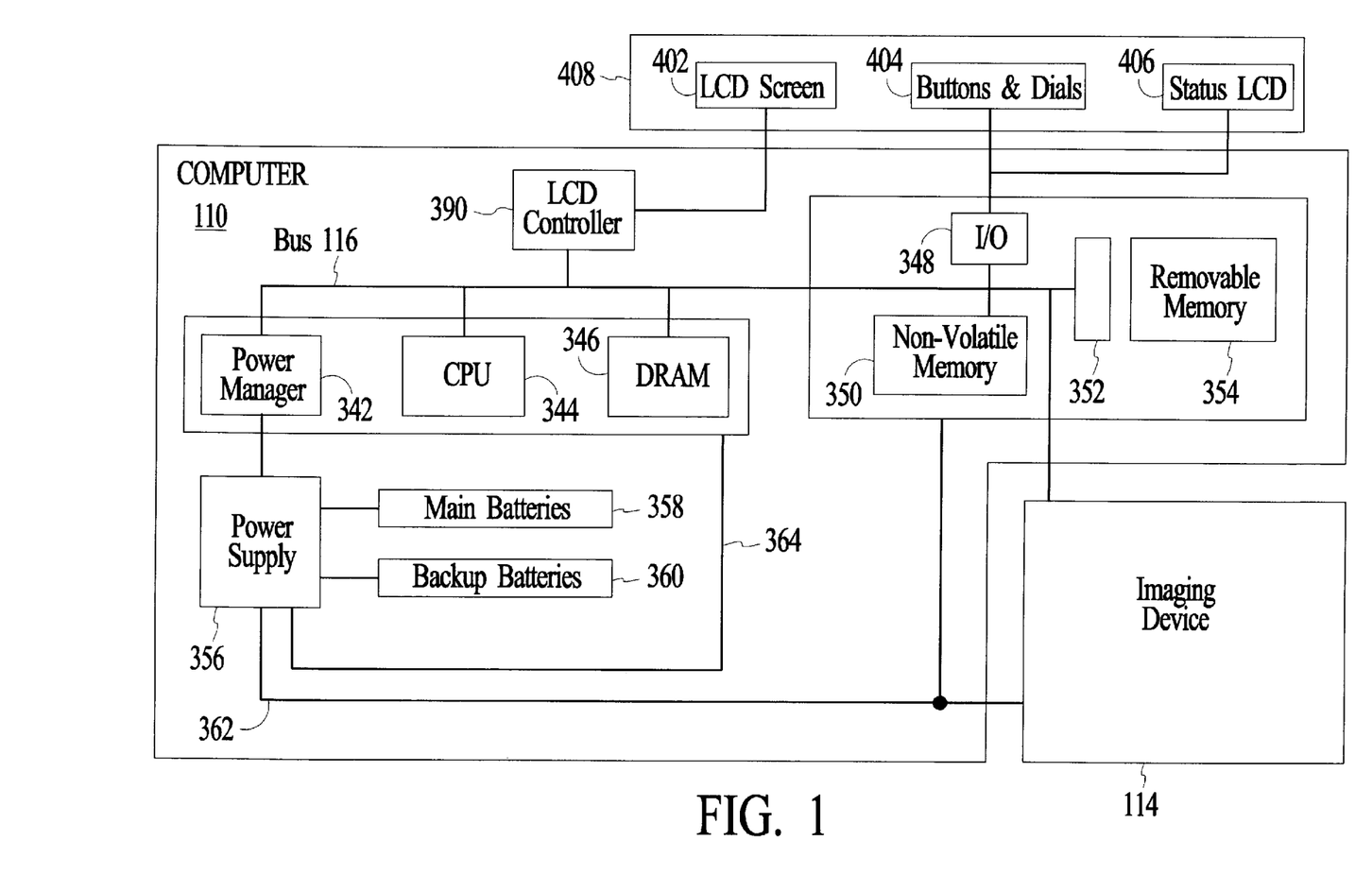
FIG. 1 illustrates a block diagram of one preferred embodiment of a digital camera is shown for use in accordance with the present invention.

Referring now to FIG. 1, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS (Complementary Metal Oxide Semiconductor) sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 244 runs an operating system that includes a menu-driven GUI (graphical user interface) and provides image processing through software, rather than hardware. An example of such software is the DIGITA Operating Environment by FlashPoint Technology of San Jose, Calif. Although CPU 344 is preferably a microprocessor, one or more DSPs (digital signal processor) or ASICs (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred, embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 462 for display.

Figure 2A:
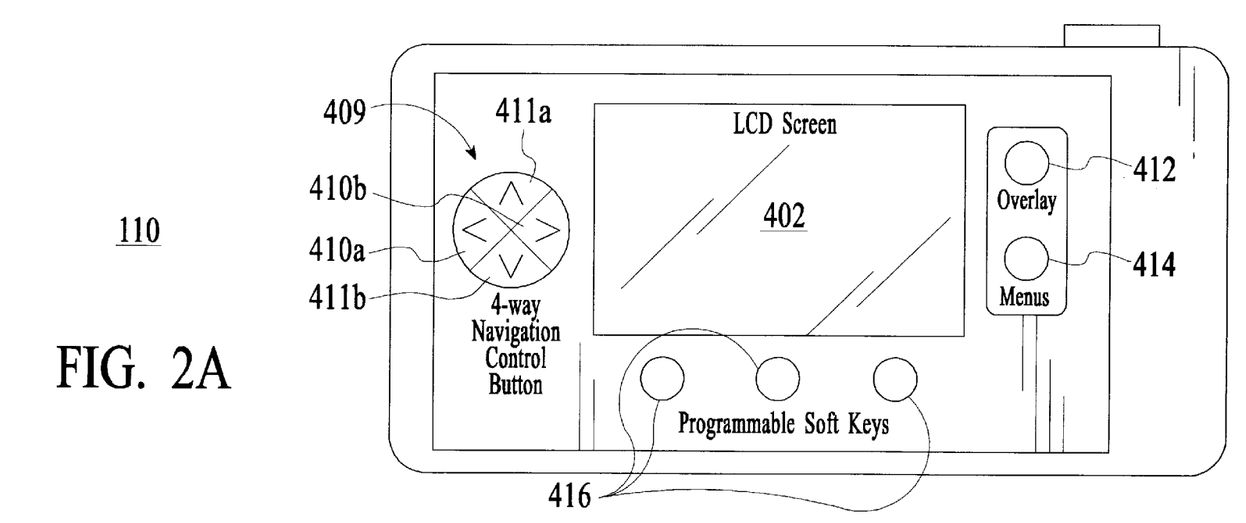
FIGS. 2A and 2B are diagrams depicting exemplary hardware components of the camera's user interface.
Figure 2B:
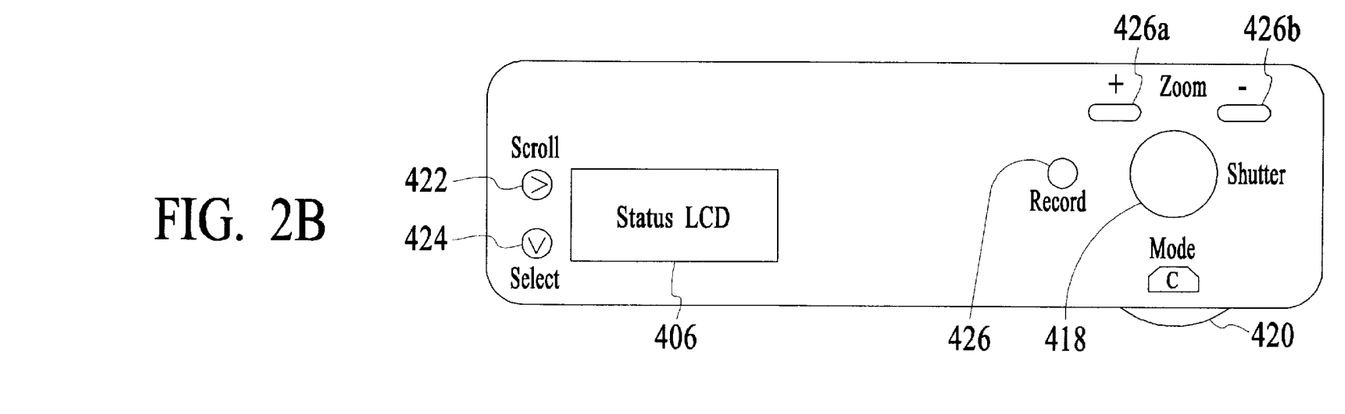

FIGS. 2A and 2B are diagrams depicting exemplary hardware components of the camera's user interface 408. FIG. 2A is back view of the camera 110 showing the LCD screen 402, a four-way navigation control button 409 (including up/down buttons 411a, 411b), an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. Further preferably included is a review mode.

Figure 3:
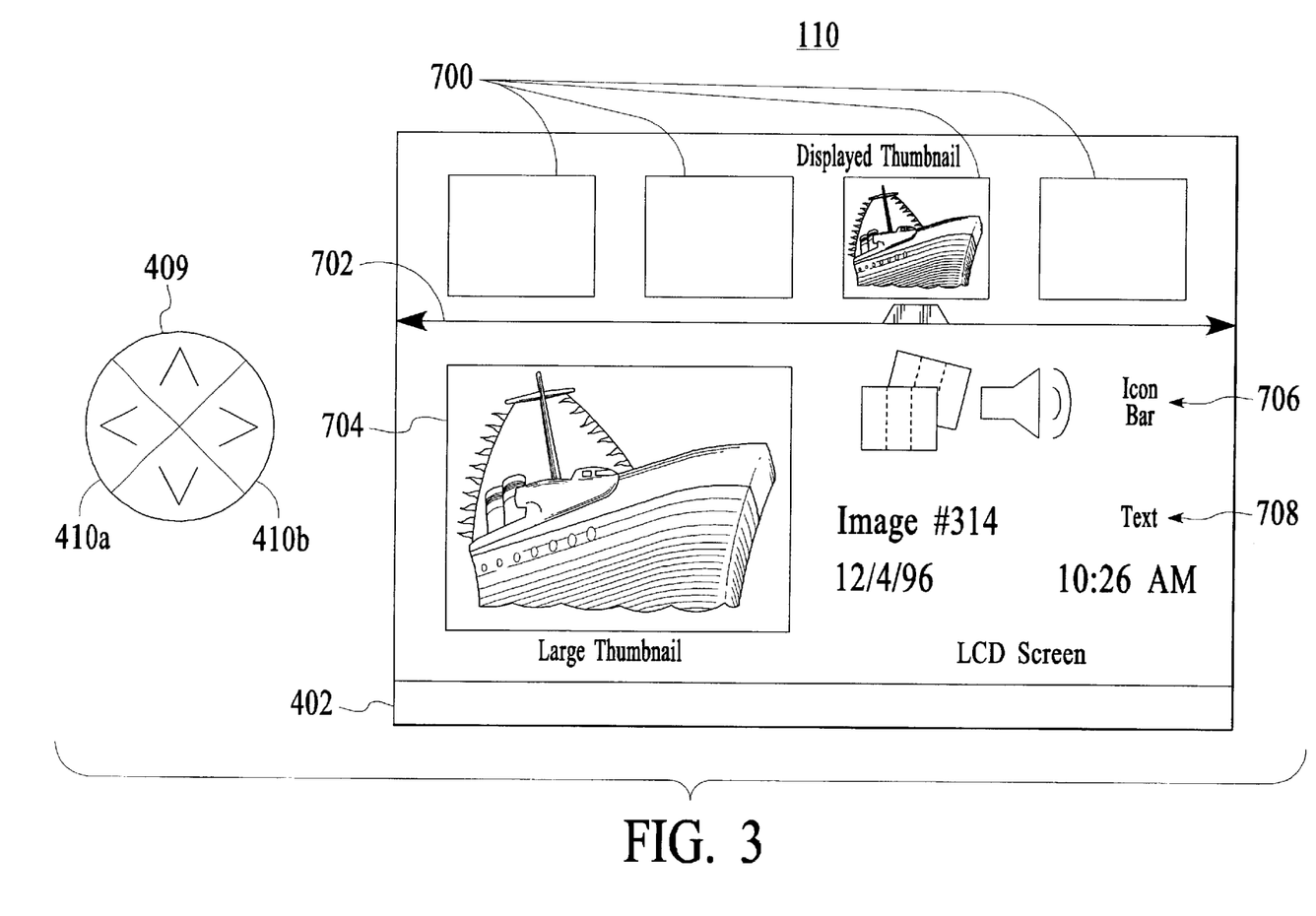
FIG. 3 is a diagram illustrating the operation and appearance of the user interface when the camera is placed into review mode.

Referring now to FIG. 3, a diagram illustrating the operation and appearance of the user interface when the camera is placed into review mode is shown. The review mode enables the user to view all the images in the camera along with specific attributes associated with each of the images.

The review screen layout is based on a filmstrip metaphor which allows users to quickly move forward and backward among pictures chronologically. In a preferred embodiment, several small-sized versions of the captured images, called thumbnails 700, are displayed in a row across the LCD screen 402. The user may scroll through the series of displayed thumbnails 700 in the LCD screen 402 using the four-way navigation control button 409. The direction of scrolling is capably mapped to the horizontal left/right buttons 410a and 410b. When the user presses the left/right buttons 410, the thumbnails 700 are scrolled-off the LCD screen 402 and replaced by new thumbnails 700 representing other captured images.

A stationary selection arrow line 702 is used as both a navigational aid and to indicate which thumbnail is the currently selected image. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the selected image.

When a thumbnail 700 becomes the selected image, additional information corresponding to that image is automatically displayed. In a preferred embodiment, the additional information includes a large thumbnail 704 showing a larger view of the selected thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 4:
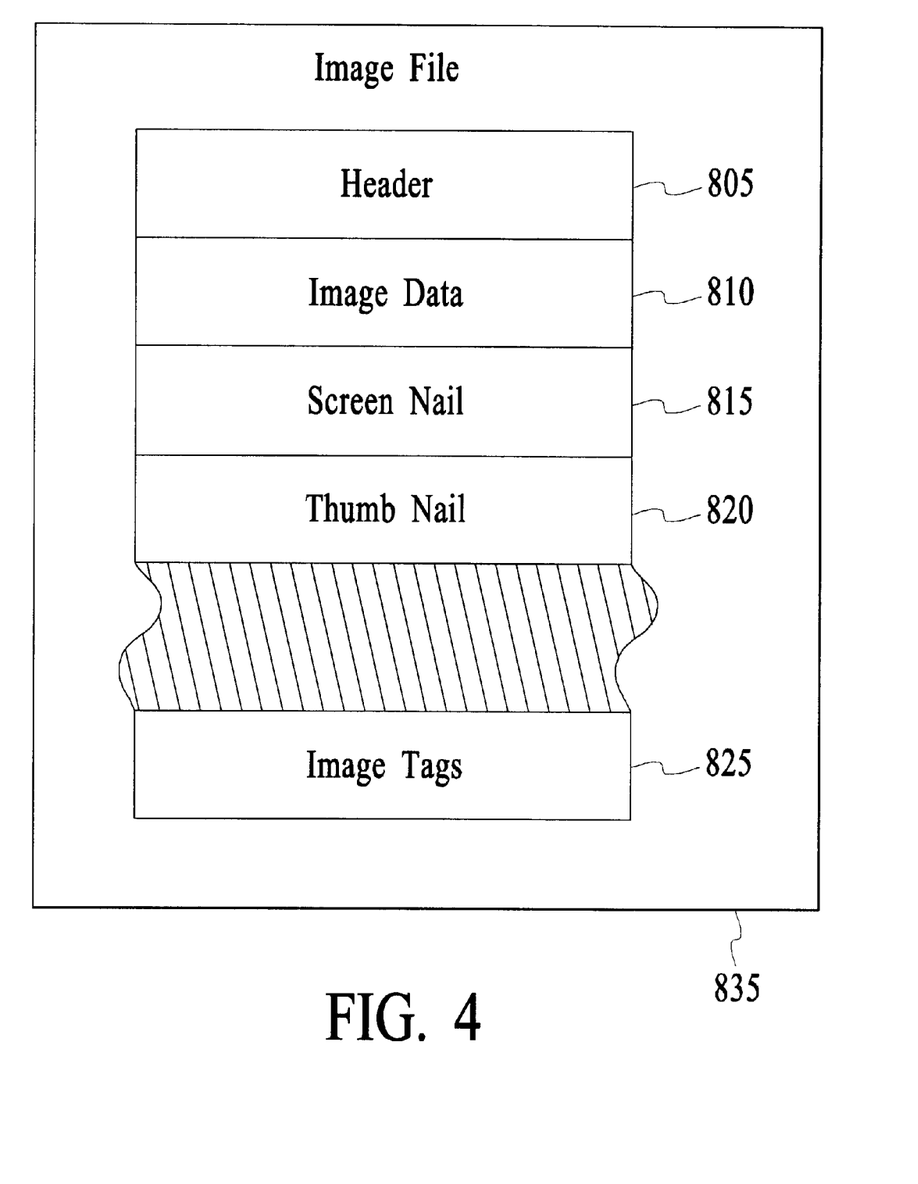
FIG. 4 illustrates a diagram of one embodiment for an image file.

FIG. 4 illustrates a diagram of one embodiment for an image file 835. Image file 835 includes a header 805, image data 810, a screennail 815, a thumbnail 820, and image tags 825.

Header 805 preferably includes information that identifies and describes the various contents of image file 835. Image data 810 contains actual captured image data. Image data 810 exists in whichever format that is appropriate for the current location of image file 835 within the image processing chain of the camera 110. Screennail 815 and thumbnail 820 are each different versions of image data 810 that have varying degrees of reduced resolution for a number of special viewing applications.

Figure 5:
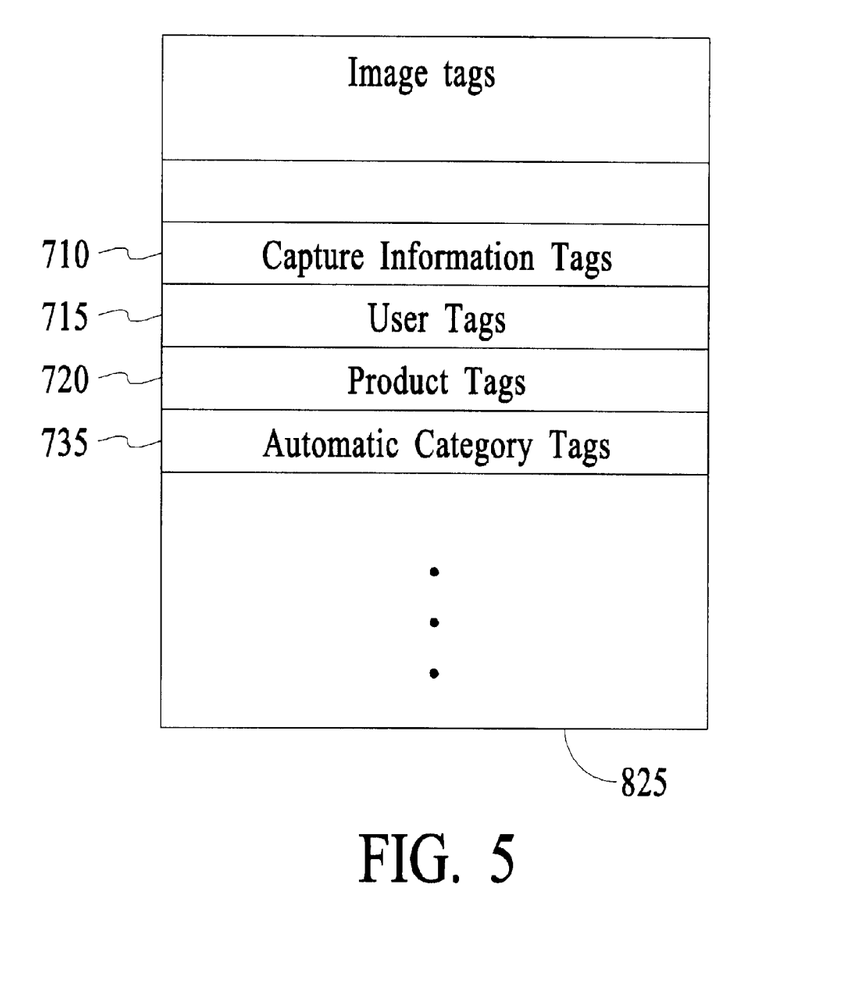
FIG. 5 illustrates a diagram of one embodiment for the image tags.

Image tags 825 include various types of information that correspond and relate to particular captured image data 810, as discussed in conjunction with FIG. 5.

Referring to FIG. 5, a diagram of one embodiment for the image tags 825 is shown. In the FIG. 5 embodiment, image tags 825 include capture information tags, user tags 715, product tags 720, and automatic category tags 735. Capture information tags 710 preferably include various types of information that correlate with the capture image data 810.

For example, capture information tags 710 may indicate focus setting, aperture setting, and other relevant information that may be used for effectively processing or analyzing the corresponding image data. User tags 715 include those labels a user specifies for a given image, often referred to as 'stamps', such as 'birthday' or 'vacation', etc., that aid in personal categorization of the images. Product tags 720 typically contain various other information, such as camera 110 manufacturer.

Automatic category tags 735 result from analysis of the image data, such as described in co-pending U.S. patent application, Ser. No. 09/121,760, entitled "System and Method for Automatic Analysis and Categorization of Images in an Electronic Imaging Device, assigned to the assignee of the present invention, and filed Jul. 23, 1998. For example, individual image analysis may generate automatic category tags 735 based on detection of a person or groups of persons according to characteristics, like substantial amounts of flesh tones within the image. Category tags resulting from detection of nature scenes from characteristics, like substantial green content in the image combined with the relative lack of hard edges, are also possibly automatically generated. Similarly, categories like city images, water images, or indoor images may be detected by characteristic features contained in those images.

In the processing of the digital images in camera 110, to conserve storage space, compression techniques are routinely employed, such as JPEG compression techniques. Compression techniques normally are chosen based on a balance between the time needed to perform the compression and the amount of data loss during compression. Usually, higher quality compression techniques, i.e., more lossless techniques, take longer to perform. While storage space is conserved through compression, conserving enough storage space in camera 110 for at least one image is always desirable to ensure that at any moment, a desired image is able to be captured. Accordingly, in the present invention, maintaining sufficient storage space is achieved for a digital camera.

Figure 6:
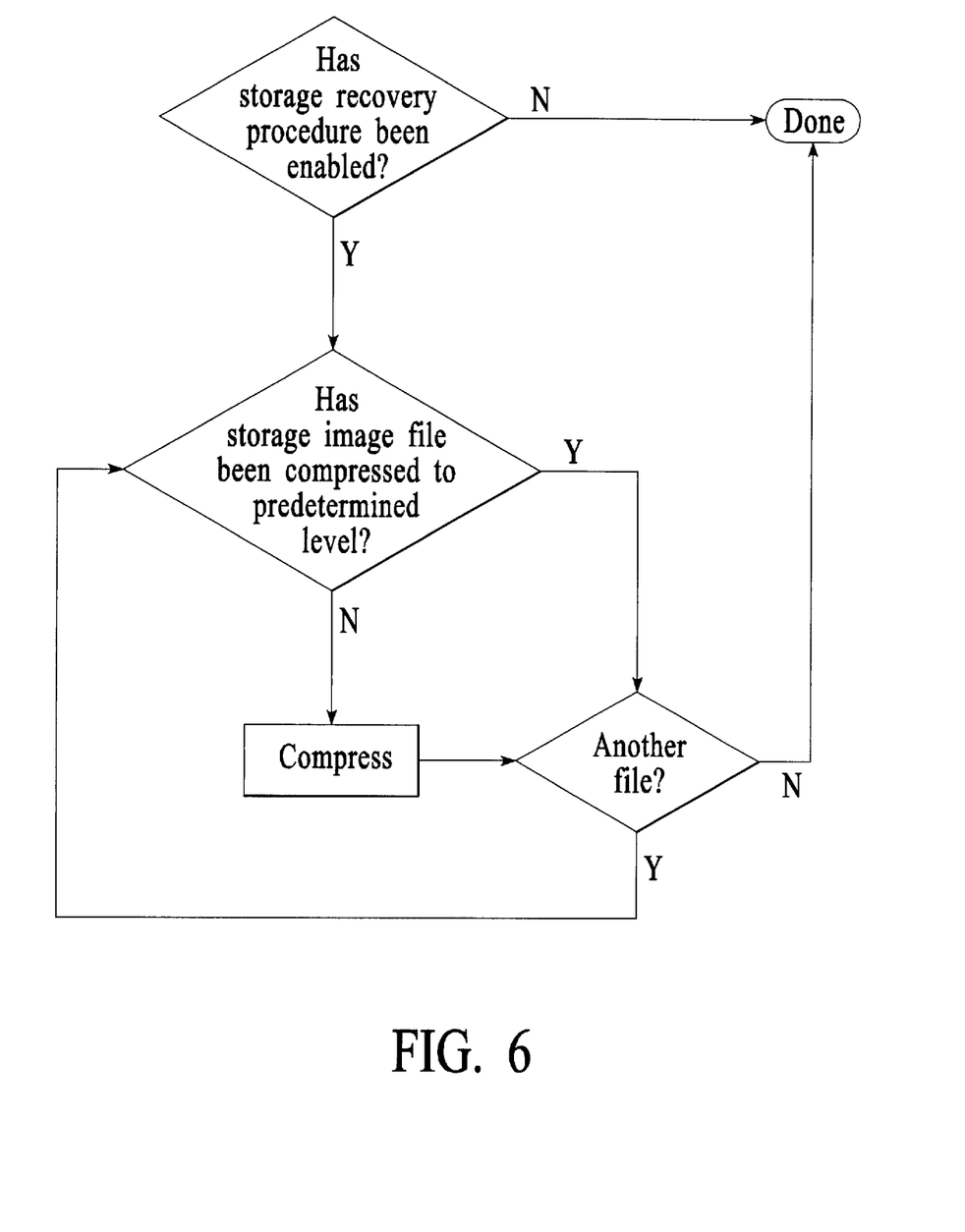
FIG. 6 illustrates a block flow diagram of a method for increasing storage capacity in accordance with the present invention.

Referring to FIG. 6, a flow diagram illustrates an overall sequence for producing storage space from saved image files in accordance with the present invention. The method initiates once a storage recovery procedure has been enabled, as determined via step 1000. By way of example, insufficient storage space for an image may not be discovered until an attempt is made by a user to take an image. In accordance with one embodiment, therefore, the decision to initiate storage recovery occurs when a user responds affirmatively to an appropriate prompt that is provided by the camera 110 when there is not enough storage space for a current attempt to capture an image. Alternatively, the storage recovery procedure may be initiated as a continuous background process through selection of a menu item or another appropriate selection means by a user when setting up an image capture session.

Once enabled, the storage recovery procedure continues with examination of stored image files to determine whether the stored image file has been compressed to a predetermined compression level (step 1002). If the image file has not been compressed to the predetermined level, the image file is compressed to the predetermined level (step 1004). For example, as previously mentioned, JPEG compression techniques are often employed to compress image data before storage. Thus, most image files will be stored as compressed JPEG files. However, further compression of the image file is possible via alternative 115 compression techniques, such as wavelet compression algorithms. Thus, the storage recovery procedure employs the alternative compression algorithm to further compress a stored image file to the predetermined level. The identification of the level of compression is capably done by identifying a file extension that indicates compression, such as ".jpg" for JPEG files or by looking in the file header. Once the predetermined compression level has been reached, the process continues with a next image file, as determined via step 1006, until enough storage space has been freed, or there are no more stored image files that require further compression. In this manner, an increase in the storage capacity of a digital camera is achieved.

Thus, the present invention efficiently maintains sufficient storage space for capturing an image. While the level of compression for a given image file has been described as a preferred designator for identifying files that are processed to produce additional storage space, the designation may also be done more specifically by a user. For example, a user may know that certain files that are still being carried in the camera have actually been copied/archived. Thus, a user could tag these files when viewed in review mode, such as through a menu selection item, as highest priority candidates for further compression. Conversely, certain files could also be tagged as unavailable for further compression, such as when it is desired to maintain the quality of the image. Of course, the process of FIG. 6 would then require a first check for files tagged with the priority to perform the additional compression on these files first and a check to determine whether the file has been marked as unavailable for further compression. Thus, the ability to increase storage is adaptive to accommodate user's inputs.

Although the present invention has been described in accordance with the embodiments shown, one of ordinary skill in the art will readily recognize that there could be variations to the embodiments and those variations would be within the spirit and scope of the present invention. It should be appreciated that although particular mention has been made of JPEG file formats, the present invention is suitable for use with any file format, not just JPEG. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for producing storage space in a digital image capture device, the method comprising:
    (a) identifying a level of compression of a saved image file in the digital image capture device;
    (b) comparing the identified level of compression with a predetermined level of compression;
    (c) compressing the saved image file to the predetermined level of compression when the identified level of compression does not match the predetermined level of compression to free storage space in the digital image capture device; and
    (d) performing steps (a), (b), and (c) in response to insufficient storage space during an image capture session.

2. The method of claim 1 further comprising performing steps (a), (b), and (c) as a background process in the digital image capture device.

3. The method of claim 1 further comprising selecting the performance of steps (a), (b), and (c) by a user during the image capture session.

4. The method of claim 1 wherein the identified level of compression results from compression according to a JPEG compression algorithm.

5. The method of claim 1 wherein the predetermined compression level results from compression according to a wavelet compression algorithm.

6. The method of claim 1 further comprising repeating steps (a), (b), and (c) for each digital image saved in the digital image capture device.

7. A method for reclaiming storage space in a digital image capture device during an image capture session, the method comprising:

initiating capture of a digital image;

identifying insufficient storage space for the digital image in the digital image capture device;

determining whether a storage recovery procedure is desired; and reclaiming storage space through the storage recovery procedure from at least one saved digital image file when the storage recovery procedure is desired.

8. The method of claim 7 wherein the storage recovery procedure further comprises:

(a) identifying a level of compression of a saved image file in the digital image capture device;

(b) comparing the identified level of compression with a predetermined level of compression; and (c) compressing the saved image file to the predetermined level of compression when the identified level of compression does not match the predetermined level of compression to free storage space in the digital image capture device.

9. The method of claim 8 further comprising repeating steps (a), (b), and (c) until enough storage space has been reclaimed to store the digital image.

10. The method of claim 8 wherein the identified level of compression results from compression according to a JPEG compression algorithm.

11. The method of claim 8 wherein the predetermined compression level results from compression according to a wavelet compression algorithm.

12. The method of claim 8 furtherer comprising designating an image file as unavailable for the storage recovery procedure.

13. A system for increasing storage capacity in a digital image capture device, the system comprising:

storage means for storing digital image data captured with the digital image capture device; and processing means for processing the digital image data to form digital images, wherein the processing means identifies insufficient storage space for a digital image in the digital image capture device during an image capture session initiated by capture of a digital image, determines whether a storage recovery procedure is desired, and reclaims storage space in the storage means through the storage recovery procedure from at least one saved digital image file in the storage means when the storage recovery procedure is desired.

14. The system of claim 13 wherein the processing means performs the storage recovery procedure by:

(a) identifying a level of compression of a saved image file in the digital image capture device;

(b) comparing the identified level of compression with a predetermined level of compression; and (c) compressing the saved image file to the predetermined level of compression when the identified level of compression does not match the predetermined level of compression to free storage space in the digital image capture device.

15. The system of claim 14 wherein the processing means repeats steps (a), (b), and (c) until enough storage space has been reclaimed in the storage means to store the digital image.

16. The system of claim 15 wherein the identified level of compression results from compression according to a JPEG compression algorithm.

17. The system of claim 15 wherein the predetermined compression level results from compression according to a wavelet compression algorithm.

* * * * *